(12) United States Patent
Andresen

(10) Patent No.: US 9,175,494 B2
(45) Date of Patent: *Nov. 3, 2015

(54) METHOD OF ASSEMBLING A TUBULAR BUILDING STRUCTURE BY USING SCREW SOCKETS

(71) Applicant: Andresen Towers A/S, Nyborg (DK)

(72) Inventor: Tom Andresen, Odense SV (DK)

(73) Assignee: ANDRESEN TOWERS A/S, Nyborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,966

(22) Filed: Apr. 1, 2015

(65) Prior Publication Data

US 2015/0204102 A1   Jul. 23, 2015

Related U.S. Application Data

(62) Division of application No. 13/810,167, filed as application No. PCT/DK2011/050262 on Jul. 4, 2011, now Pat. No. 9,091,098.

(30) Foreign Application Priority Data

Jul. 13, 2010   (DK) .............................. 2010 070330

(51) Int. Cl.
*E04H 12/34* (2006.01)
*E04H 12/08* (2006.01)
(Continued)

(52) U.S. Cl.
CPC .............. *E04H 12/342* (2013.01); *E04H 12/00* (2013.01); *E04H 12/08* (2013.01); *E04H 12/34* (2013.01);
(Continued)

(58) Field of Classification Search
CPC ........ E04H 12/34; E04H 12/08; E04H 12/342; F03D 11/04; F05B 2240/912
USPC .......... 52/40, 651.01, 651.07, 745.17, 745.18
See application file for complete search history.

(56) References Cited

U.S. PATENT DOCUMENTS 2,850,191 A   9/1958   Buck .............................. 414/617
3,462,114 A   8/1969   O'Dell Jr. et al. ............ 249/195
(Continued)

FOREIGN PATENT DOCUMENTS

EP   06375531       2/1995
EP   1318300 A1    6/2003
(Continued)

OTHER PUBLICATIONS

Selected documents from the prosecution history of related European Patent Application No. 11730554.0 (9 pages total): May 15, 2013 communication from the EPO (1 page) including an 8-page enclosure from a Third Party concerning the patentability of the present invention (dated May 2, 2013).
(Continued)

*Primary Examiner* — Rodney Mintz
(74) *Attorney, Agent, or Firm* — Blue Filament Law PLLC; Avery N. Goldstein

(57) ABSTRACT

A method of assembling a tubular building structure 1 comprising a circumferential wall structure formed from a plurality of wall elements 2,20. The method comprises mutually assembling at least some of the wall elements 2,20 by use of screw sockets 4 mounted in holes in the wall elements 2,20 and bolts. The wall elements may be superposed tube sections 2 arranged on top of each other, and these tube sections 2 may be formed by interconnecting axially extending tube segments 20. In some embodiments of the invention, the screw sockets 4 are mounted at the manufacturing site, and the wall elements 2,20 are subsequently transported to the erection site of the tubular building structure 1. Preferably the mutual assembly of the wall elements 2,20 is performable solely by people working inside the tubular building structure 1 fastening the bolts 5 to the pre-mounted screw sockets 4.

14 Claims, 2 Drawing Sheets

(51) Int. Cl.
*E04H 12/00* (2006.01)
*F03D 11/04* (2006.01)

(52) U.S. Cl.
CPC ............ *F03D 11/04* (2013.01); *F05B 2240/912* (2013.01); *Y02B 10/30* (2013.01); *Y02E 10/728* (2013.01); *Y10T 29/49623* (2015.01); *Y10T 29/49631* (2015.01)

(56) References Cited

U.S. PATENT DOCUMENTS

| | | | |
|---|---|---|---|
| 3,722,565 A | 3/1973 | Miller et al. | 411/180 |
| 4,376,604 A * | 3/1983 | Pratt et al. | 411/34 |
| 4,490,083 A | 12/1984 | Rebish | |
| 4,740,388 A * | 4/1988 | Nakashima | 427/193 |
| 4,875,815 A | 10/1989 | Phillips, II | 411/38 |
| 5,066,446 A | 11/1991 | Phillips, II | 264/242 |
| 5,236,293 A | 8/1993 | McSherry et al. | 411/344 |
| 5,244,326 A | 9/1993 | Henriksen | |
| 5,333,436 A | 8/1994 | Noble | 52/849 |
| 5,687,537 A | 11/1997 | Noble | 52/849 |
| 6,012,763 A | 1/2000 | Clemente et al. | 296/186.4 |
| 6,224,309 B1 | 5/2001 | Yamamoto | 411/11 |
| 6,655,102 B1 * | 12/2003 | LaRue | 52/311.1 |
| 6,754,044 B1 * | 6/2004 | Braunheim et al. | 360/244.6 |
| 6,957,518 B1 | 10/2005 | Koch, Jr. | 52/849 |
| 7,464,512 B1 | 12/2008 | Perina | |
| 7,905,069 B1 | 3/2011 | Lockwood | 52/514 |
| 8,056,297 B2 | 11/2011 | Mathai et al. | 52/651.01 |
| 8,057,144 B2 | 11/2011 | Johnson et al. | 411/34 |
| 8,209,913 B2 | 7/2012 | Murata | 52/40 |
| 8,225,576 B2 | 7/2012 | Kristensen | 52/741.14 |
| 8,240,955 B2 | 8/2012 | Nies | 405/204 |
| 8,267,630 B2 | 9/2012 | Moon et al. | 411/338 |
| 8,272,173 B2 | 9/2012 | Jakubowski | 52/40 |
| 8,387,331 B2 | 3/2013 | Laursen | 52/655.1 |
| 8,413,405 B2 | 4/2013 | Meesenburg | 52/745.17 |
| 8,434,982 B2 | 5/2013 | Henriksen, Jr. | 411/338 |
| 8,490,337 B2 | 7/2013 | Word et al. | 52/40 |
| 8,506,218 B2 | 8/2013 | Delgado Matarranz et al. | 410/44 |
| 8,590,276 B2 | 11/2013 | Kryger et al. | 52/845 |
| 8,683,760 B2 | 4/2014 | Segers | 52/173.3 |
| 8,915,043 B2 * | 12/2014 | Zheng et al. | 52/651.01 |
| 9,085,897 B2 * | 7/2015 | Quine | B64G 5/00 244/158.5 |
| 9,091,098 B2 * | 7/2015 | Andresen | E04H 12/08 52/745.17 |
| 9,109,580 B2 * | 8/2015 | Markgraf | F03D 11/005 52/40 |
| 2004/0134161 A1 | 7/2004 | Lockwood et al. | 52/736.1 |
| 2006/0000185 A1 | 1/2006 | Wobben | 52/745.15 |
| 2006/0123735 A1 | 6/2006 | Fuellhaas et al. | |
| 2006/0175465 A1 * | 8/2006 | Teichert | 244/33 |
| 2006/0272244 A1 | 12/2006 | Jensen | 52/223.5 |
| 2007/0243037 A1 | 10/2007 | Pratt | |
| 2008/0041009 A1 | 2/2008 | Cairo et al. | 52/651.07 |
| 2008/0256892 A1 | 10/2008 | Franke | 52/655.1 |
| 2008/0308696 A1 | 12/2008 | Kristensen | |
| 2009/0016897 A1 | 1/2009 | Olgaard | 416/244 R |
| 2009/0021019 A1 * | 1/2009 | Thomsen | 290/55 |
| 2009/0044482 A1 | 2/2009 | Tooman | 52/699 |
| 2009/0090069 A1 | 4/2009 | Willis | |
| 2009/0266160 A1 | 10/2009 | Jeffrey et al. | 73/455 |
| 2010/0006710 A1 | 1/2010 | Lyness et al. | 248/70 |
| 2010/0007149 A1 | 1/2010 | Willey | 290/55 |
| 2010/0058673 A1 | 3/2010 | Numajiri | 52/40 |
| 2010/0101173 A1 | 4/2010 | Bagepalli | 52/651.01 |
| 2010/0126079 A1 | 5/2010 | Kristensen | 52/40 |
| 2010/0126115 A1 | 5/2010 | Lim et al. | 52/848 |
| 2010/0163683 A1 * | 7/2010 | Quine | B64G 5/00 244/158.5 |
| 2010/0313497 A1 | 12/2010 | Jensen | 52/173.1 |
| 2010/0319276 A1 | 12/2010 | Kryger et al. | 52/173.1 |
| 2011/0024233 A1 * | 2/2011 | Lott | 182/129 |
| 2011/0088331 A1 | 4/2011 | Olgaard | 52/40 |
| 2011/0127109 A1 * | 6/2011 | Teichert | 182/19 |
| 2011/0131898 A1 | 6/2011 | Nies et al. | 52/173.1 |
| 2011/0140447 A1 | 6/2011 | Paura et al. | 290/55 |
| 2011/0170983 A1 | 7/2011 | Day et al. | 411/370 |
| 2011/0188945 A1 * | 8/2011 | Hartkopf | 405/224 |
| 2011/0255934 A1 | 10/2011 | Delgado Matarranz et al. | 410/55 |
| 2012/0000158 A1 | 1/2012 | Laursen | 52/651.01 |
| 2012/0023864 A1 * | 2/2012 | Zheng et al. | 52/782.1 |
| 2012/0067441 A1 | 3/2012 | Korus et al. | 137/561 R |
| 2012/0141295 A1 | 6/2012 | Martinez De Castaneda et al. | 416/244 R |
| 2012/0204500 A1 | 8/2012 | Segers | 52/173.3 |
| 2012/0210668 A1 | 8/2012 | Kryger et al. | 52/645 |
| 2012/0304588 A1 * | 12/2012 | von Ahn | 52/745.17 |
| 2012/0308338 A1 * | 12/2012 | von Ahn | 414/10 |
| 2012/0317918 A1 | 12/2012 | Rasmussen et al. | 52/651.01 |
| 2013/0000241 A1 | 1/2013 | Jensen et al. | 52/651.01 |
| 2013/0081350 A1 | 4/2013 | Bogl et al. | 52/651.01 |
| 2013/0180199 A1 | 7/2013 | Vadlamudi et al. | 52/651.01 |
| 2013/0205686 A1 | 8/2013 | Kawabata | 52/98 |
| 2013/0219821 A1 * | 8/2013 | Andresen | 52/651.01 |
| 2013/0269286 A1 | 10/2013 | Bogl et al. | 52/745.18 |
| 2014/0137507 A1 * | 5/2014 | Heltoft et al. | 52/651.01 |
| 2014/0331568 A1 | 11/2014 | Andersen et al. | 52/40 |

FOREIGN PATENT DOCUMENTS

| | | |
|---|---|---|
| EP | 2574780 A1 | 4/2013 |
| GB | 191022892 | 10/1911 |
| GB | 311439 | 5/1929 |
| GB | 550455 | 1/1943 |
| GB | 1428723 | 7/1973 |
| NZ | 336490 | 6/2002 |
| WO | 2004083633 | 9/2004 |
| WO | 2007082531 | 7/2007 |
| WO | WO 2007095940 A1 | 8/2007 |
| WO | 2010033149 | 3/2010 |
| WO | WO 2011147478 A1 | 12/2011 |
| WO | 2012007000 | 1/2012 |

OTHER PUBLICATIONS

PSM International Global Fastening Solutions, Product Brochure "Sheet Metal Fasteners", Mar. 2010.
PSM International Global Fastening Solutions, Product Brochure "Self Clinching Nuts", Mar. 2010.
PSM International Global Fastening Solutions, Product Brochure "Anchor Rivet Bush", Mar. 2010.
Lancaster Fastener Co. Ltds., Product Brouchure "Threadforming Screw Stock List 2007", 2007.
Machine translation of EP 1318300 A1 retrieved from Espacenet. com on Aug. 5, 2013 (5 pages).
M. Veljkovic et al. "High-Strength Tower in Steel for Wind Turbines (HISTWIN)", European Commission, Directorate-General for Research and Innovation, Research Fund for Coal and Steel Unit; RFCS Publications, email: rtd-steel-coal@ec.europa.eu; Contract No. RFSR-CT-2006-00031, Jul. 1, 2006 to Jun. 30, 2009; pp. 1-168.

* cited by examiner

METHOD OF ASSEMBLING A TUBULAR BUILDING STRUCTURE BY USING SCREW SOCKETS

RELATED APPLICATIONS

This application is a divisional application of U.S. patent application Ser. No. 13/810,167 filed May 9, 2013 that in turn is a national phase of PCT/DK2011/050262 filed Jul. 4, 2011 that in turn claims priority benefit of Danish Application Serial Number PA 2010 70330; the contents of which are hereby incorporated by reference.

FIELD OF THE INVENTION

The present invention relates to a method of assembling a tubular building structure and in particular to a method of assembling a tubular building structure comprising a circumferential wall structure formed from a plurality of wall elements.

BACKGROUND OF THE INVENTION

Tubular building structures are used in a number of applications, such as for telecommunication towers, amusement towers and wind turbine towers. In such towers having a substantially closed outer surface, the structures are often made from tube sections of rolled steel plate arranged on top of each other. For large diameter structures, each tube section may be formed by interconnected axially extending tube segments, whereby they are easier to transport from the manufacturing site to the erection site. Such tube segments are typically made from rolled or bent steel plate. The tube sections can be joined by welding, but this may cause weaknesses e.g. due to induction of thermal stresses and therefore require highly skilled people and appropriate quality control. Alternatively, the tube sections can be joined by using traditional bolts and nuts, but this method also has some disadvantages. The plates are typically surface treated at the manufacturing site, but moisture percolating into the screw connections over time often results in corrosion which may be undesired for aesthetic reasons and which potentially leads to structural weaknesses.

Another disadvantage of assembling closed structures by traditional bolt-and-nut connections is that it requires access to both sides of the structure being assembled at the same time. This is particularly problematic when assembling so tall building structures that the people performing the assembly cannot stand on the ground.

Hence, an improved method of assembling a tubular building structure would be advantageous, and in particular a more efficient and/or reliable method would be advantageous.

OBJECT OF THE INVENTION

It is an object of the present invention to provide a method of assembling a tubular building structure by which method the corrosion resistance of the joining points can be improved compared to known methods.

It is a further object of the present invention to provide a method of assembling a tubular building structure by which the assembly can be performed from one side of the tubular building structure, such as from the inside.

It is a further object of the present invention to provide an alternative to the prior art.

SUMMARY OF THE INVENTION

Thus, the above described objects and several other objects are intended to be obtained in an aspect of the invention by providing a method of assembling a tubular building structure comprising a circumferential wall structure formed from a plurality of wall elements, the method comprising the step of mutually assembling at least some of the wall elements by use of screw sockets mounted in holes in the wall elements and bolts.

The wall elements may be made from plate material, such as from steel plates. The plates may e.g. be shaped by rolling or by bending.

In some embodiments of the invention, at least some of the wall elements are superposed tube sections, and the method comprises the step of arranging the tube sections on top of each other.

At least some of the wall elements may be axially extending tube segments, and preferably they are interconnected to form the tube sections. "Wall element" is thus used in relation both to tube sections and tube segments. A method according to the present invention may then comprise the step of interconnecting the tube segments along opposite longitudinal sides by use of screw sockets mounted in holes in the tube segments and bolts.

Such tube segments may have inwardly extending flanges along opposite edges so that the tube sections are formed by assembling the tube segments along these flanges. Such assembly may be done by traditional bolt-and-nut connections or by use of screw sockets and bolts.

The screw sockets may be mounted in the wall elements at the manufacturing site, and the wall elements may subsequently be transported to the erection site of the tubular building structure. Hereby it becomes possible to perform a surface treatment of the wall elements with the screw sockets mounted therein at the manufacturing site.

By "manufacturing site" is preferably meant the same location as where the wall elements are manufactured, e.g. by rolling or bending of steel plates. However, the present invention also covers a method in which the screw sockets are mounted in the wall elements at a different manufacturing site. This can e.g. be relevant for a company erecting the tubular building structure after having bought the wall elements and the screw sockets from two different suppliers.

A possible method may comprise the following steps:
- a first surface treatment of at least an exterior of the wall elements,
- insertion of the screw sockets into holes in the wall elements, and
- a second surface treatment of at least the exterior of the wall elements with the screw sockets inserted therein.

The first and second surface treatments are preferably done at the same manufacturing site, but it is also covered by the present invention to have the two surface treatments done at different locations, such as by sub-contractors specialized in different treatment methods.

By "exterior" is preferably meant the side forming the outer surface of the tubular building structure after erection.

In a method comprising these steps, the first surface treatment may be selected from one or more of the following processes: galvanizing, such as hot dip galvanizing, powder coating and wet paint system. Other appropriate surface treatments may also be used; such processes will be well-known to a person skilled in the art. The second surface treatment may comprise application of a coating, such as lacquer, powder coating and/or wet paint system. Hereby a sealed outer surface can be obtained whereby the risk of moisture percolating into the connections over time and the resulting likely corrosion can be minimised compared to traditional assembly methods by use of ordinary bolt-and-nut connections. Further surface treatments may be performed if desired.

At least some of the screw sockets may each comprise a serrated circumferential surface adapted to provide frictional resistance against rotation of the screw socket after mounting. Alternatively the mating surfaces may be un-serrated. Both for serrated and un-serrated surfaces the screw sockets may be fastened by press fit, magnets and/or adhesive.

In preferred embodiments of the invention, the mutual assembly of the wall elements is performable solely by people working inside the tubular building structure fastening the bolts to the mounted screw sockets. The people can e.g. stand on platforms arranged inside the tubular building structure. Hereby the people are better protected from bad weather conditions, such as heavy wind. Furthermore, for tall building structures it can be avoided to use cranes to lift people to the necessary height on the outside where it would be inconvenient or impossible to use platforms.

For alternative embodiments, the mutual assembly of the wall elements is performable solely by people working outside the tubular building structure fastening the bolts to the mounted screw sockets; this being obtained by changing the orientation of the screw sockets. This possibility is particularly relevant for building structures being so narrow that is would be impossible or inconvenient to have people working inside the structure.

In an embodiment of the present invention, the tubular building structure is a wind turbine tower comprising a bedframe, and the method may further comprise the step of mounting the bedframe by use of screw sockets and bolts. Hereby it will be easier to perform the mounting when there is only limited space for people and for the tools used during the assembling process. The above advantages mentioned in relation to surface treatment of the tube sections and the tube segments also apply for the area of the bedframe.

A method as described above may be used for assembly of any tubular building structure where it is desired to reach one or more of the objects of the present invention. Such a tubular building structure may e.g. be a wind turbine tower.

BRIEF DESCRIPTION OF THE FIGURES

The method of assembling a tubular building structure according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
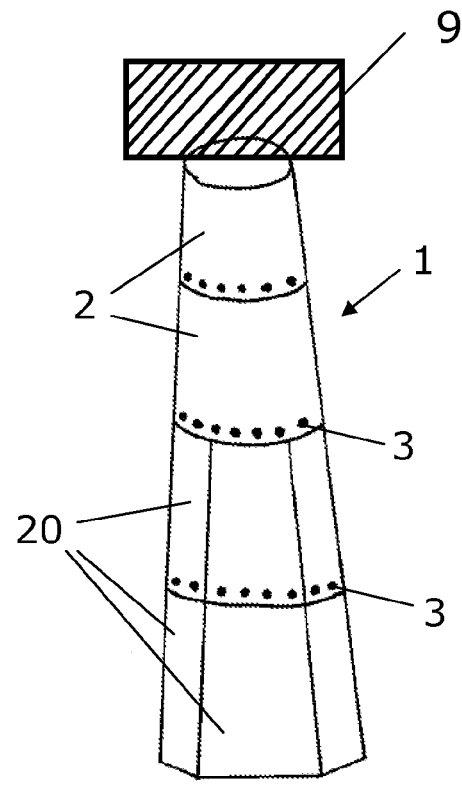
FIG. 1 shows schematically a tubular building structure comprising four tube sections arranged on top of each other.

Tubular building structures 1 are used in a number of applications including towers for telecommunication and for wind turbines. They are often made from superposed tube sections 2 which are arranged on top of each other by use of a crane and assembled by welding or by use of traditional bolt-and-nut connections. FIG. 1 shows a tubular building structure 1 with four tube sections 2 assembled by bolts and screw sockets as illustrated schematically by the rows of bolts or screw sockets 3. They are shown as arranged in one row for illustrative purposes only. In practise the number of bolts and screw sockets 3 is significantly larger than what is shown in the figure, and there are typically also more rows of bolts and screw sockets to ensure a strong connection. When the tubular building structure 1 is a wind turbine tower, it may comprise a bedframe 9 mounted by use of screw sockets and bolts.

The tube sections 2 may e.g. be made from plate material, such as from rolled or bent steel plate. Each tube section 2 may also be formed by interconnecting axially extending tube segments 20 as shown schematically for the two lower tube sections 2 in FIG. 1. The wall elements as used above can refer to either tube sections or tube segments being assembled to tube sections. The assembly from tube segments 20 may be advantageous with respect to transportation of large diameter structures, as the tube segments 20 can be transported stacked on top of each other and assembled to tube sections 2 at the erection site. Typically all tube sections 2 will be made from tube segments 20, but it is also possible to form only the largest tube sections 2 in this way.

The tubular building structure 1 in FIG. 1 is shown with an upwardly decreasing circular cross section, but any cross section is covered by the scope of the present invention. The cross section may also be constant or upwardly increasing.

Figure 2:
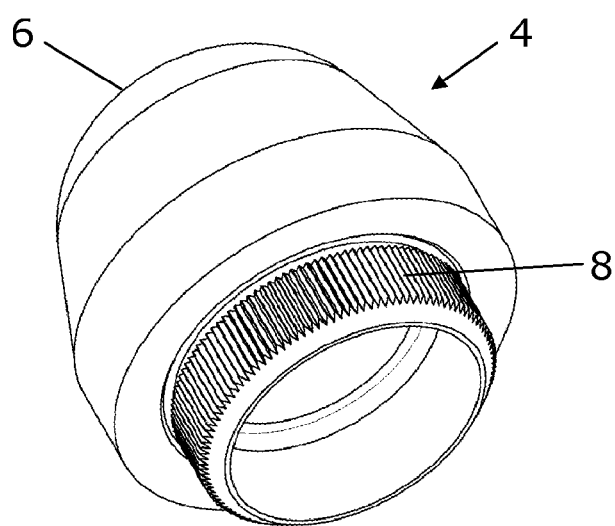
FIG. 2 is a three dimensional view of an example of a screw socket.
Figure 4:
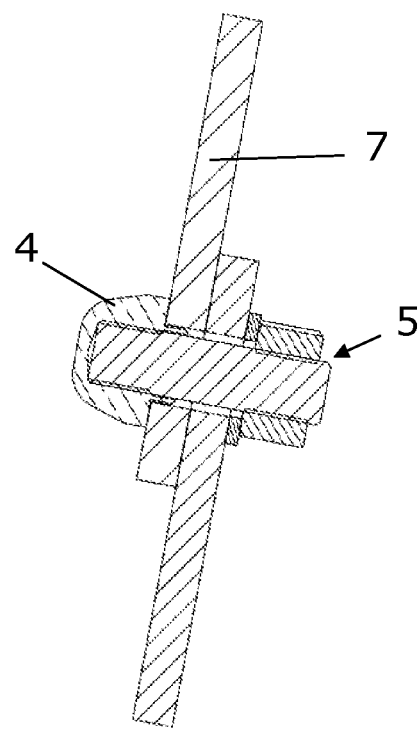
FIG. 4 shows schematically two plates assembled by use of a screw socket and a bolt. The two plates may be tube sections of a tubular building structure assembled according to the present invention.

A method of assembling a tubular building structure 1 according to the present invention comprises the use of screw sockets 4 and bolts 5 (see FIG. 4). Such a screw socket 4 may e.g. look as the one shown in FIG. 2. The screw sockets 4 are preferably formed with a closed cap end 6 as that provides the best protection against moisture percolating into the connections. The screw sockets 4 are preferably arranged so that the cap end 6 will be on the outer surface of the tubular building structure 1. This means that the bolts 5 can be screwed into the screw sockets 4 during assembly of the tubular building structure 1 from the inside of the tubular building structure 1, i.e. without the need to have people or tools on the outside of the tubular building structure 1 during erection thereof.

Figure 3:
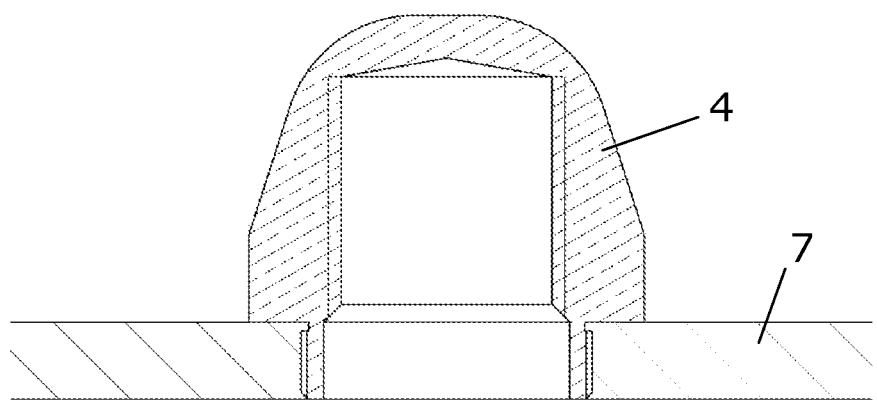
FIG. 3 is a cross sectional view of a screw socket mounted in a plate which may be a part of a tube section for a tubular building structure.

FIG. 3 is a cross sectional view of a screw socket 4 after insertion in a plate 7. The plate 7 may also be thicker than the part of the screw socket 4 being inserted therein. An example of tube sections 2 assembled according to the present invention is shown schematically in FIG. 4.

The screw socket 4 is e.g. pressed into the hole in the plate 7 by any suitable method which will be well-known to a person skilled in the art. The circumferential surface 8 of the screw socket 4 which engages with the hole in the plate 7 is serrated in the embodiment shown in FIG. 2 to provide a large torsional resistance against slip when the bolt 5 is subsequently joined with the screw socket 4. However, screw sockets 4 without this serration are also covered by the present invention. For both types of surfaces, the fastening may comprise gluing or use of magnets.

In a preferred embodiment of the invention, the screw sockets 4 are mounted in holes in the tube sections 2 at the manufacturing site, and the tube sections 2 are subsequently transported to the erection site of the tubular building structure 1. The assembly is then performed by screwing bolts 5 into the screw sockets 4. The use of pre-mounted screw sockets 4 means that this can be performed solely by people working inside the tubular building structure, e.g. while standing on permanent or temporary platforms. Hereby the assembly process is made easier compared to methods requiring people working from both the inside and the outside of the tubular building structure. Furthermore, the workers are hereby protected from e.g. strong winds.

The manufacturing typically comprises surface treatment which e.g. comprises the following steps:
- a first surface treatment of at least an outer surface of the tube sections 2 and/or the screw sockets 4,
- insertion of the screw sockets 4 into holes in the tube sections 2, and
- a second surface treatment of at least an outer surface of the tube sections 2 with the screw sockets 4 inserted therein.

Hereby it is possible to obtain a sealed outer surface whereby the risk of moisture percolation and resulting corrosion is minimised compared to assembly methods based on traditional bolt-and-nut connections.

The first surface treatment may e.g. comprise galvanizing, such as hot dip galvanizing, powder coating and wet paint system. The second surface treatment may comprise application of a coating, such as lacquer and/or paint.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of assembling a tubular building structure of a wind turbine tower comprising a circumferential wall structure formed from a plurality of wall elements, the method comprising:
    performing a first surface treatment of an exterior of the plurality of wall elements,
    inserting screw sockets into holes in the plurality wall elements, and
    performing a second surface treatment of the exterior of the plurality of wall elements with the screw sockets inserted therein,
    the method further comprising mutually assembling two or more of the plurality of wall elements by use of the screw sockets fixedly mounted in the holes in the plurality of wall elements and bolts which are screwed into the screw sockets to perform the assembly of the tubular building structure.

2. The method according to claim 1, wherein the plurality of wall elements are made from plate material.

3. The method according to claim 1, wherein two or more of the plurality of wall elements are superposed tube sections, the method further comprising arranging the tube sections on top of each other.

4. The method according to claim 1, wherein the screw sockets are mounted in the plurality of wall elements at a manufacturing site, and wherein the plurality of wall elements are subsequently transported to an erection site of the tubular building structure.

5. The method according to claim 1, wherein the first surface treatment is selected from one or more of the following processes: galvanizing, powder coating and wet paint system.

6. The method according to claim 1, wherein two or more of the screw sockets each comprises a serrated circumferential surface adapted to provide frictional resistance against rotation of the screw socket after mounting.

7. The method according to claim 1, wherein the screw sockets are mounted by one or more of press fit, magnets or adhesive.

8. The method according to claim 1, wherein the mutual assembly of the plurality of wall elements is performable solely from inside of the tubular building structure of the wind turbine tower by fastening the bolts to the mounted screw sockets.

9. The method according to claim 1, wherein the tubular building structure of the wind turbine tower comprises a bedframe, the method further comprising mounting the bedframe by use of the screw sockets and the bolts.

10. The method according to claim 1, wherein two or more of the plurality of all elements are axially extending tube segments.

11. The method according to claim 10, the method further comprising interconnecting the tube segments along opposite longitudinal sides by use of the screw sockets mounted in the holes in the tube segments and the bolts which are screwed into the screw sockets to perform the assembly.

12. The method according to claim 1, wherein the second surface treatment comprises application of a coating.

13. The method according to claim 12, wherein the coating is one or more of lacquer, powder coating, or wet paint system.

14. A wind turbine tower assembled by the method of claim 1.

* * * * *